D. M. WESTON.
MACHINE FOR SEPARATING LIQUIDS FROM PAINTS AND OTHER SUBSTANCES.
No. 74,021. Patented Feb. 4, 1868.
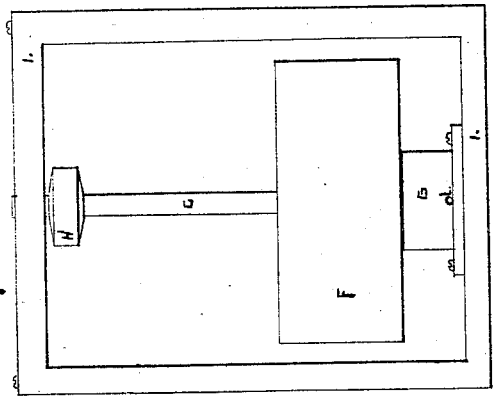
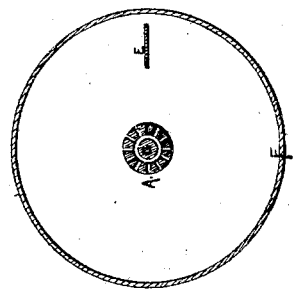
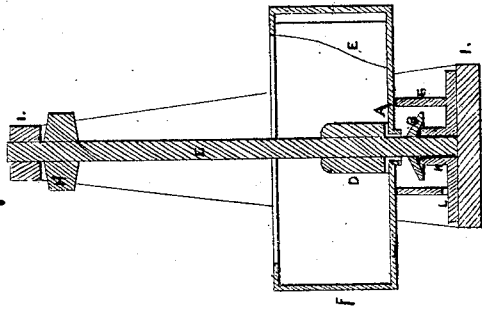

United States Patent Office.

DAVID M. WESTON, OF BOSTON, MASSACHUSETTS.

*Letters Patent No. 74,021, dated February 4, 1868.*

IMPROVED MACHINE FOR SEPARATING LIQUIDS FROM PAINTS AND OTHER SOLID SUBSTANCES.

*The Schedule referred to in these Letters Patent and making part of the same.*

Be it known that I, DAVID M. WESTON, of the city of Boston, in the State of Massachusetts, have invented a new and useful Machine for Separating Liquids from Denser Materials, such as Colors, Paints, &c., by centripetal action; and I do hereby declare that the following is a full, clear, and exact description of the construction and operation of the same, reference being had to the annexed drawings, making part of this specification, in which—

Figure 1 is a perspective view.
Figure 2 is a longitudinal section.
Figure 3 is a transverse section.

I is an upright frame, to which the machine is suspended. C is an upright shaft, to which the pulley H is attached at the top, and the cylinder F at the bottom. The cylinder F is open at the top, with a narrow flange around the upper edge of the circumference. D is the hub of the cylinder F, with numerous small passages or outlets at A, extending through the bottom of the cylinder for the escape of the liquid contents. E is an upright longitudinal partition, extending from the flange around the open top of the cylinder F to its bottom, and detached from the inner side of the circumference of the cylinder, so as to leave a passage around it. B is a disk around the shaft C, and attached to it under the openings A, in the bottom of the cylinder F, protecting the oiled bearing below from the escaping liquids. K is the step, in which the lower end of the shaft C has its bearing. G is a curb or vessel around the step K, to receive the escaping liquids, with an outlet, L, in the bottom.

Power being applied to the pulley H, while the shaft C and cylinder F are revolving at a low speed, the cylinder is charged through its open top with pulverized material, containing liquid matter to be separated therefrom. As the speed increases, the fine particles of dense material will be deposited upon the perpendicular side of the inner circumference of the cylinder, forcing the liquid matter toward the centre. When the separation is complete, the power is withdrawn, and the cylinder and contents are allowed to revolve until their momentum is lost and the motion subsides. As the speed decreases, the upright partition or breakwater E arrests the motion of the liquid in travelling around the circumference of the cylinder, and prevents the action of the liquid, which would otherwise disturb or wash down the wall or crust of deposited material. When the momentum of the cylinder and its contents is nearly lost, the liquid will settle gently toward the hub of the cylinder and escape through the small passages at A, which extend through the hub and bottom of the cylinder. The escaping liquid flows over the disk B, which protects the oiled bearing, in the step K beneath, and falls into the curb G, from which it passes off through the outlet L.

I claim the revolving cylinder F, without openings or perforations in the circumference, substantially as described.

I claim the cylinder F, in combination with the passages or outlets, or their equivalents, at A, in the hub and bottom, substantially as described.

I claim the breakwater E, or its equivalent, in combination with the cylinder F, substantially as described.

D. M. WESTON

Witnesses:
 AUGUSTUS RUSS,
 J. M. F. HOWARD.